United States Patent [19]

Peterson et al.

[11] Patent Number: 4,797,241

[45] Date of Patent: Jan. 10, 1989

[54] METHOD FOR PRODUCING MULTIPLE POLYCRYSTALLINE BODIES

[75] Inventors: Gary R. Peterson, Orem; M. Duane Horton, Provo, both of Utah

[73] Assignee: SII Megadiamond, Provo, Utah

[21] Appl. No.: 736,422

[22] Filed: May 20, 1985

[51] Int. Cl.$^4$ .............................................. C04B 38/06
[52] U.S. Cl. ....................................... 264/63; 51/307; 51/309; 264/140; 264/141
[58] Field of Search ......................... 264/63, 140, 141; 51/307, 309

[56] References Cited

U.S. PATENT DOCUMENTS

| | | | |
|---|---|---|---|
| 3,745,623 | 7/1973 | Wentorf, Jr. et al. | 29/95 B |
| 3,819,814 | 6/1974 | Pope | 423/446 |
| 4,224,380 | 9/1980 | Bovenkerk et al. | 428/545 |
| 4,241,135 | 12/1980 | Lee | 51/307 |
| 4,288,248 | 9/1981 | Bovenkerk et al. | 75/226 |
| 4,417,906 | 11/1983 | Ohno | 51/307 |
| 4,448,591 | 5/1984 | Ohno | 51/298 |
| 4,525,178 | 6/1985 | Hall | 51/309 |
| 4,525,179 | 6/1985 | Gigl | 51/309 |
| 4,650,776 | 3/1987 | Cerceau | 501/96 |

FOREIGN PATENT DOCUMENTS 0071036 9/1983 European Pat. Off. .

Primary Examiner—James Derrington
Attorney, Agent, or Firm—Willian Brinks Olds Hofer Gilson & Lione Ltd.

[57] ABSTRACT

A method is provided for producing multiple polycrystalline diamond and/or CBN bodies. The method involves mixing a temporary binding agent, such as paraffin, with a quantity of the crystals and then molding or extruding that mixture to produce temporarily held bodies. The temporarily held bodies are then placed in a reaction chamber and surrounded by a pressure transmitting medium, such as powdered cemented tungsten carbide. Preferably, the paraffin is removed by heat and vacuum. The reaction chamber is then pressed and heated thereby creating discrete polycrystalline diamond and/or CBN bodies of approximately the same shape and size as the temporarily held bodies. The preferred embodiment also includes the step of placing a separating layer of cobalt and graphite powder around the temporarily held bodies before they are surrounded by the pressure transmitting medium.

27 Claims, 1 Drawing Sheet

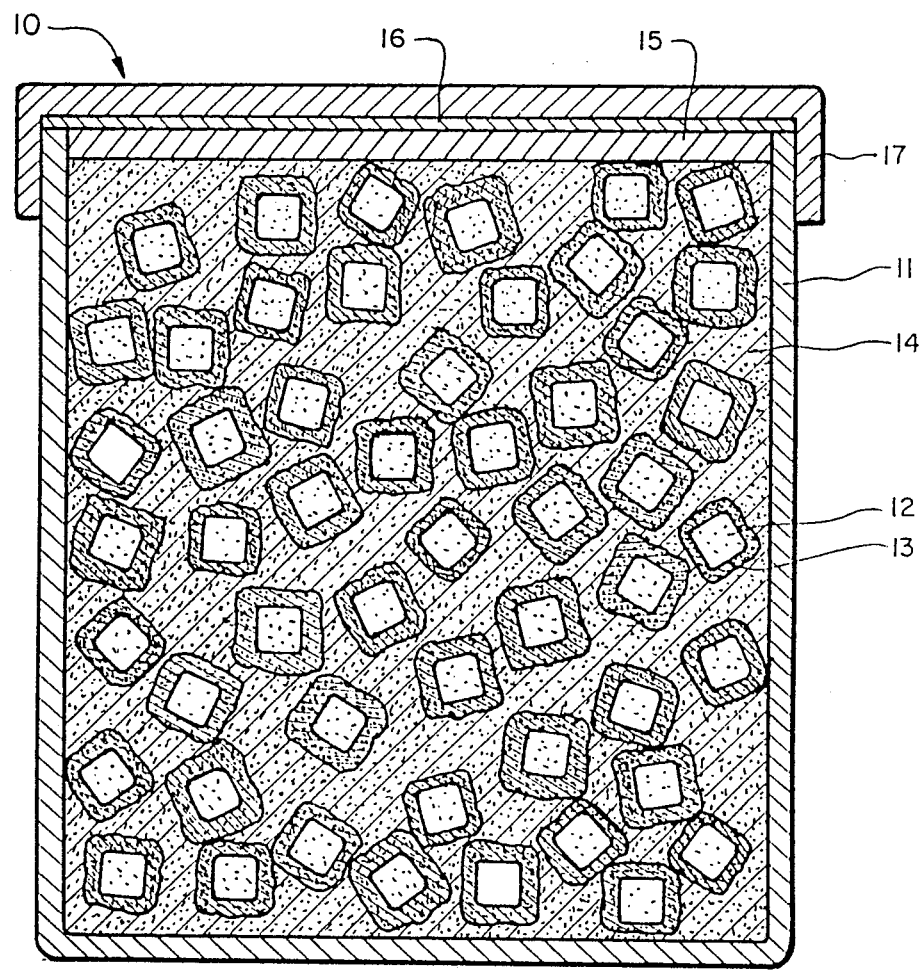
FIG. 1
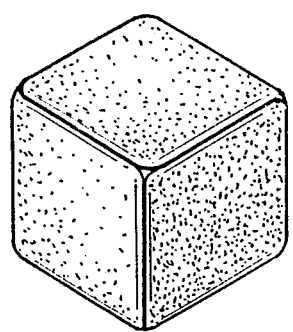  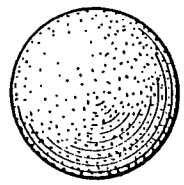  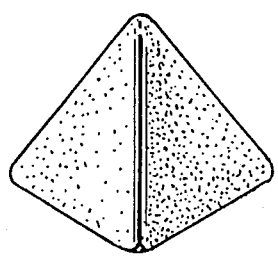
FIG. 2a  FIG. 2b  FIG. 2c

METHOD FOR PRODUCING MULTIPLE POLYCRYSTALLINE BODIES

BACKGROUND OF THE INVENTION

This invention relates to processes for manufacturing polycrystalline bodies. These bodies may be comprised of polycrystalline diamond, polycrystalline cubic boron nitride, and polycrystalline wurzitic boron nitride, as well as combinations thereof. For convenience in the following discussion and claims the terms CBN and cubic boron nitride are intended to refer to both of the cubic and wurzitic high pressure forms of boron nitride. In addition, as used in the following specification and claims, the term "polycrystalline" refers to the type of structure which is characterized by substantial intercrystalline bonding between adjacent crystals.

In recent years the manufacture and use of polycrystalline diamond (PCD) and polycrystalline CBN (PCBN) in various applications has become well established. In most of these applications the PCD or PCBN body is used as a distinct cutting element or wear part and is held and supported by some type of tool.

A contrasting use of diamond is to incorporate single crystal diamonds in a metal matrix to make matrix cutters for use in concrete saws, core drills and the like. The sizes used for these matrix cutters are typically between 100 and 10 U.S. mesh.

The use of single crystal diamonds in a metal matrix presents certain disadvantages. For one, the sizes of diamond crystals suitable for metal matrix use are expensive to obtain. This is so because the cost of natural and synthetic diamond increases with size and quality. A second disadvantage results from the fact that diamond crystals can be fractured with relatively low impact force when that force is applied parallel to the crystals' planes of cleavage. Naturally, such fracturing causes premature loss of the crystal to use. A third disadvantage is the poor attachability of the diamond crystals to the matrix. In particular, because single crystal diamond has a relatively smooth surface that is virtually non-wettable, mechanical forces must be relied on to hold a crystal in the matrix. As a result, when too much of the matrix material wears away and exposes more than half of a particular crystal, that crystal will become disattached and, of course, lost to use.

It has occurred to the inventors that using polycrystalline diamond or polycrystalline CBN in the place of single crystal diamond could ameliorate these problems. First, the cost of obtaining these sizes of PCD pieces should be less than that of obtaining single crystals. Second, the impact resistance of PCD is greater than that of single crystal diamond because of the random orientation of the many individual crystals in PCD. Third, it ought to be possible to produce PCD in predetermined shapes which would have enhanced attachability in the matrix.

Unfortunately however, a satisfactory method of obtaining PCD or PCBN bodies which could be used in this application, to the best of the inventors' knowledge, was not available in the prior art. That is, a method was not found in the art for efficiently producing large quantities of well-shaped 100 to 10 U.S. mesh PCD or PCBN pieces.

One possible method is to produce larger pieces of PCD or PCBN and then to cut them to the desired size. However, this is inefficient because PCD is relatively hard to cut. Although PCD may be cut with an electric discharge machine, the process is expensive in terms of capital, energy, and labor. For example, the inventors have observed that 10 to 20 carats of 25 mesh PCD requires about 24 hours to cut.

Another method which has been tried is to crush larger bodies of PCD or PCBN into smaller pieces. One problem with this method is that a range of shapes and sizes are produced in the crushing process. That is, pieces both above and below the desired size are produced. Also, the shapes are irregular and tend to be elongate rather than blocky as desired for matrix applications.

Another method is to mold PCD or PCBN pieces in a process such as that described in U.S. Pat. No. 3,819,814 wherein quantities of crystals with a catalyst/binder are placed in a rigid mold made from a material such as cemented tungsten carbide or graphite. However, because the pieces required are so small and the quantity desired from each press run is so high, this type of molding is likewise impractical. In addition, the molds, which can only be used once, are relatively expensive due to their intricateness together with their chemical and physical requirements.

Another molding technique is taught in the European Patent Application No. 071,036. In this method, the reaction chamber is divided by partitioning strips of metal. In this way, multiple pieces of PCD or PCBN are produced. However, the number and minimum size is limited in this method. That is, it would be difficult if not impossible to provide the large number of extremely thin partitions needed to efficiently produce large quantities of these smaller sized PCD or PCBN pieces.

SUMMARY OF THE INVENTION

The present invention is a method of producing multiple polycrystalline bodies. Briefly, the method comprises a first step of shaping quantities of diamond, graphite, CBN, or hexagonal boron nitride crystals into temporarily held bodies of predetermined shapes and sizes. These temporarily held bodies are then placed in a reaction chamber and surrounded by a pressure transmitting medium. The reaction chamber is then subjected to pressure and temperature conditions sufficient to form discrete polycrystalline bodies of approximately the same shapes and slightly reduced sizes as the temporarily held bodies. Preferably, the pressure transmitting medium is subsequently removed thereby freeing the discrete polycrystalline bodies.

In accord with one embodiment of the present invention, the temporarily held bodies are created by adding a temporary binding agent, such as paraffin, to diamond or CBN crystals, after which the mixture is shaped, either by molding or extruding, into predetermined shapes and sizes, preferably cubes with about 1.0 mm sides. Also, the molded or extruded masses can be further shaped by cutting. The temporarily held bodies are preferably coated with a separating layer comprising cobalt and graphite powder. In this same embodiment, the coated temporarily held bodies are placed in a reaction chamber and then a powder comprising cobalt bonded cemented tungsten carbide is poured around them. The temporary binding means is then removed by heat and vacuum which volatilizes the paraffin. The reaction chamber with its contents is then pressed to between 45 and 65 Kbars and heated to between 1300 and 1700 deg. C. for a time sufficient to allow substantial intercrystalline bonding between adjacent crystals in the bodies. After pressing, the pressure transmitting medium may be removed by chemical dissolution or mechanical erosion, thereby freeing the discrete PCD or PCBN bodies.

BRIEF DESCRIPTION OF THE DRAWINGS

FIG. 1 is a cross section of a reaction chamber with the temporarily held bodies and pressure transmitting medium loaded.

FIGS. 2a–c are perspective views of a cubic, spherical, and pyramidical polycrystalline diamond body made according to the preferred embodiment.

DETAILED DESCRIPTION

The first step in the method of the present invention is to obtain a quantity of diamond and or CBN crystals which can be formed into the polycrystalline bodies. Either diamond, CBN, or mixtures thereof may be used to form the polycrystalline bodies of the present invention. At present, diamond is preferred because of its superior wear resistance and hardness. However, there are certain applications where CBN may be preferred. For example, if a large percentage of iron is contained in the workpiece, CBN is preferred because it is not degraded by iron as diamond can be.

In addition, because it is possible to create PCD directly from graphite, see, for example, the process taught in U.S. Pat. No. 3,850,053, it may be desirable to begin with a quantity of graphite crystals or a mixture of diamond and graphite crystals. Likewise, in that U.S. Pat. No. 4,425,315 teaches a process for producing PCBN from hexagonal boron nitride (HBN), it may be desirable to begin with a quantity of HBN or a mixture of CBN and HBN.

The diamond crystals used may be either synthetic or natural. Also, the particle size may be varied depending on the properties desired in the finished polycrystalline body. Such size selection is known in the art. In the preferred embodiment of this invention, the diamond crystals are between 0 and 5 microns. It may also be desirable to use specific ranges of sizes in order achieve a greater density or more even packing of the crystals.

Although it is possible to produce PCD or PCBN without a catalyst/binder material, it is preferred to include such a material with the diamond or CBN crystals. A catalyst/binder material may either be in powder form and mixed in with the crystals, or it may be present in a layer which is adjacent to the crystal mass. When using diamond crystals as in the preferred embodiment, the most preferable catalyst/binder material is cobalt powder which is mixed in with the crystals and present at about 13 weight percent of the diamond cobalt mixture. When using CBN crystals, the most preferable catalyst/binder is a powdered mixture of 30 weight percent aluminum and 70 weight percent silicon, which catalyst/binder is present in about 17% volume percent with the CBN.

The next step in the method is to shape quantities of the crystals into temporarily held bodies. Preferably, this is done with the aid of a temporary binding means such as a waxy, substance like paraffin or a material such as naphthalene.

The major requirement for the temporary binding means is that it should either be physically and chemically compatible with the system for forming the polycrystalline bodies, or it should be capable of being removed prior to the pressing of the cell. The amount of temporary binding means added is preferably no more than that amount which is necessary to coat the crystals and cause sufficient adherence of the crystals to allow handling. In the most preferred embodiment, paraffin is used in about 10 weight percent of the diamond, cobalt and paraffin mixture. The preferred paraffin is a common grade such as that used in home canning.

The method of mixing the diamond, cobalt, and paraffin in the preferred embodiment is as follows. First, the diamond and the cobalt powder are ball milled together in a cemented tungsten carbide lined mill for about two hours. The mixture, which is about 13 weight percen cobalt, is then chemically reduced by alternate treatment with hydrogen gas and a vacuum in a furnace. Next, the mixture is placed in a mortar and small particles, e.g. 1 mm or smaller, of wax are added and mixed in with a pestle. Paraffin can be obtained in a granulated form, or alternatively, large pieces can be grated or otherwise broken up into the desired size. Acetone is added to the wax, diamond, and cobalt mixture for the purpose of slightly dissolving the wax to enhance its mixing. Also, it is preferable to place the mortar on a warm hot plate in order to soften the paraffin and further enhance its mixing. After the acetone evaporates, the mixture is cooled and then screened through a 40 mesh screen to remove any large clumps.

Naturally, other manual and mechanical methods of mixing are available and considered within the scope of the invention. For example, to produce the mixture on a larger scale, it may be desirable to ball mill the diamond, cobalt, and paraffin together. Also, it may be preferable to use hexane in the place of acetone.

The preferred method of shaping the quantities of crystals includes a molding step wherein the mixture of crystals, catalyst/binder material, and temporary binding means is pressed into the cavities of a mold. Preferably, the mold is made of rubber and has cubic cavities which are about 1.14 mm on each edge. Certainly, other shapes and sizes for the cavities are available. In the most preferred method, after the cavities are filled with the mixture, the mold is put in a plastic bag in a stack with other similar molds. The bag is then sealed and first placed in boiling water for about 30 minutes and then placed in a hydrostatic press which is pressurized to about 10,000 p.s.i. until the molds have cooled, generally about 10 minutes. The cooled molds are then removed from the bag and a quantity of temporarily held bodies consisting of crystals, catalyst/binder, and temporary binding means are removed from the cavities. The molding process just described results in temporarily held cubes which are about 0.89 mm on a side.

Certainly, other molding techniques, which are either more or less sophisticated than this, are available for forming the temporarily held bodies. As such, these other molding techniques are considered within the scope of this invention.

In addition, it may be desirable to mold a quantity of the mixture into a larger mass, and to then cut the mass into the size and shape selected for the temporarily held body. For example, a sheet of the crystals, catalyst/binder, and temporary binding means can be molded which is 1 mm thick. This sheet can then be cut along its width and length to produce 1 mm cubes.

An alternative method of molding the temporarily held bodies is to extrude them. In this method, a mixture of the crystals, catalyst/binder (if any), and the temporary binding means is pushed through a die which forms at least one "stream" of the mixture. This "stream" is then cut into the proper size thus creating the temporarily held bodies.

Once the temporarily held bodies are obtained, it is preferred to coat each one with a separating layer. This step is not required, but it has been found to be beneficial to the yield and properties of the polycrystalline bodies (see the EXAMPLES described below for comparisons). In general, it has been found that such a separating layer is helpful in keeping the temporarily held bodies separated during handling. Also, it has been found that such a layer can enhance the formation of the polycrystalline bodies when the layer comprises a sinterig aid such as cobalt or other materials, such as the Group VIII metals, known to be chemically beneficial to the polycrystalline formation process. In addition, this layer may be used to impart particular textures to the polycrystalline bodies. That is, relatively large particles can be included in the separating layer which will be pushed into the sides of the bodies either before or during sintering. This texturing capability is advantageous as it can be used to enhance the attachment of the bodies in a metal matrix.

This separating layer preferably comprises a powder of at least one of the following materials: cobalt, cemented tungsten carbide, copper, molybdenum, titanium, or zirconium. In addition, it has been found most preferable to also include graphite or diamond powder in this layer, particularly when cobalt is used for this layer. The addition of the graphite or diamond is thought to reduce the dissolution of diamond from the temporarily held bodies when cobalt is used in the separating layer. Most preferably, the separating layer comprises cobalt powder with about 11 weight percent graphite.

The preferred method of applying the separating layer, is to place a quantity of the temporarily held bodies, a quantity of the powder and the separating layer, and some acetone in a container and then to stir this mixture until the acetone has evaporated. A 40 mesh screen is used to separate the coated temporarily held bodies from the excess cobalt/graphite powder. The result is a layer between 0.005 and 0.020 inches thick around each body.

Referring to FIG. 1 a quantity of the temporarily held bodies 12 with a separating layer 13 are loaded into the metal enclosure, cup, or "can" 11 of the reaction cell 10. This metal enclosure 11 which is closed at one end can be made from titanium, molybdenum, or other metals that have a melting point above the temperature at which the high pressure sintering process occurs and which are not chemically incompatible with the sintering process.

The temporarily held bodies 12 can be loaded by simply pouring them into the cup 11. Alternatively, the bodies 12 can be manually or mechanically placed. A powdered pressure transmitting medium 14 is loaded in the cup 11 so as to surround each body 12. Preferably, after a layer of the bodies 12 is poured in, a quantity of the powdered pressure transmitting medium 14 is poured in around and over the top of the bodies 12. Another layer of the bodies 12 is poured in and again a quantity of the pressure transmitting medium 14 is poured in around and over them. This process is repeated until the cup 11 is full. Most preferably, the cup is periodically vibrated in order to ensure full settling of the bodies 12 and medium 14. Additionally, it is most preferable to lightly tap on top of the contents of the reaction chamber periodically during this filling process. This can be accomplished by lightly tapping a flat, round punch which is inserted into the cup 11. After the cup is filled, a loosely fitting disc or lid 15 is placed over the top of the cell 10.

As an alternative to the process for surrounding the bodies 12 with the medium 14, it may be desirable to add a temporary binder to the material which will constitute the pressure transmitting medium and then to simultaneously extrude the crystals containing the crystals which individual "streams" are each surrounded by the pressure transmitting medium. This composite stream can then be cut and the "slices" placed in the reaction chamber. A separating layer is preferably placed between each "slice". Alternatively, each slice can be rotated such that the temporarily held bodies of one "slice" do not line up with the temporarily held bodies of the "slices" above and below it. Naturally, such a simultaneous extrusion process is intended for efficient high volume production.

The main function of the pressure transmitting medium 14 is to transmit to each temporarily held body 12 the pressure and heat which is applied to the reaction chamber 10. In other words, the pressure transmitting medium is required to surround the bodies 12 so that each one is subjected to the pressure and heat being applied by the press. In order to serve this function, the pressure transmitting medium 14 must have certain physical properties. First, it should be relatively non-compressible. This is to avoid excessive volume reduction in the reaction chamber 10 upon pressing.

Second, the medium as a whole should possess a certain degree of flowability at the high temperature and pressure of the press cycle. That is, the medium must be able flow enough to compensate for any unevenness of the pressure as well as to follow through after volume reduction. This is why a powder is used for the pressure transmitting medium. In addition to having a degree of flowability, a powder is advantageous to use because it is easier to work with, i.e. it may be simply poured around the temporarily held bodies. This has been found to be more efficient than preparing rigid molds.

It has been observed that when using powdered cemented tungsten carbide for the pressure transmitting medium, that the flowability of the medium can be improved by adding an amount of a metal such as copper to the medium. Naturally, it is required that this added metal be chemically compatible with the sintering process. Copper is used as this added metal in the most preferred embodiment because it does not dissolve diamond as does cobalt or other metals. In addition, copper is preferred because it has a melting point below the sintering temperature. As a result, the copper is in a liquid state which is beneficial to its function of increasing the flowability of the pressure transmitting medium.

A second function which the pressure transmitting medium 14 may serve is to enhance the texture of the polycrystalline bodies formed. That is, particles of a certain size and shape may be incorporated in the medium 14 which particles can be pushed into the sides of the bodies 12 during sintering. As a result, a texture can be created for the bodies which will increase their attachability in a metal matrix. For example, when an 80–100 mesh cemented tungsten carbide grit was used in the pressure transmitting medium and no separating layer was used, noticeable texturing of the surface was observed. As mentioned, this same function can be performed by particles in the separating layer. Naturally, whether the medium 14 has this texturing effect when a separating layer is used depends on the size of the particles in the medium 14 as well as the thickness of the separating layer.

Because it is preferable to remove the temporary binding means from the reaction chamber before the sintering process, a third function which the pressure transmitting medium 14 may be required to serve is that of retaining the shapes of the temporarily held bodies after the temporary binding means is removed.

The material constituting the pressure transmitting medium 14 should also be chemically compatible with the sintering process. That is, it should either aid in the sintering process, or at least be neutral. Naturally, whether a particular material is compatible with the sintering process depends on the catalyst/binder system selected for the formation of the polycrystalline material. For example, in the most preferred embodiment wherein a cobalt catalyst/binder is used, the pressure transmitting medium comprises cobalt bonded tungsten carbide. It has been found that the cobalt which migrates from the carbide may actually enhance the sintering of the diamond. On the other hand, if a different catalyst/binder is used or if polycrystalline CBN is being formed, it may be desirable to select a different material for the pressure transmitting medium. An example of a neutral material is an inorganic salt such as sodium chloride. Likewise, a ceramic material, such as silicon carbide, may be used. Other materials which have been used for the pressure transmitting medium include 100% cobalt and 100% silicon. The most preferred pressure transmitting medium consists of 90% tungsten carbide with a cobalt binder and 10% copper powder. The tungsten carbide consisted of a mix of 200 to 325 mesh powders.

After the temporarily held bodies 12 have been surrounded by the pressure transmitting medium 14, it is then desirable to remove the teporary binding means, i.e. the paraffin, by subjecting the loaded reaction chamber 10 to heat and vacuum. As a result, the paraffin either evaporates or decomposes and the remains are drawn off by vacuum. Alternatively, it may be desirable to remove the temporary binding means by some type of chemical washing. Also, in some embodiments, it may be desirable to leave the temporary binding means in the temporarily held bodies 12. However, because it is typically important to allow for maximum contact between the crystals and between the crystals and the catalyst/binder, it is preferred to removed the temporary binding means.

After this "dewaxing" step, a thin disc 16 is placed over the loose fitting lid and a tight fitting cap 17 is pushed down over the top of the cup 11. The thin disc 16 is most preferably made from a zirconium foil. It is thought that the zirconium foil provides a good seal for the cap 17 and that the zirconium acts as a getter for gases, thereby improving the sintering process.

The cell 10 is then placed in the center of a high pressure pressing cell (not shown). The construction of various types of pressing cells is well known in the art. In the preferred embodiment, the pressing cell is similar to that described in U.S. Pat. No. 3,913,280, which is hereby incorporated by reference. In this pressing cell, the reaction chamber is surrounded by a cylinder and two end discs made of a material which is electrically insulating. Surrounding that is a graphite tube through which current is passed for heating the reaction chamber. A molybdenum disc is placed across the bottom and top of the graphite tube for conducting current to the graphite tube from the top and bottom steel rings which conduct the electricity from the anvils of the press to the molybdenum discs. Surrounding these elements is a block of pyrophyllite which both transmits pressure and forms a gasket between the anvils of the press. Discs of pyrophyllite or salt are placed in both ends of the hole through the block. As stated, the exact construction of this as well as other types of pressing cells is considered to be well known in the art. Certainly, variations in the pressing cell can be made without departing from the scope of the present invention.

Once assembled, the pressing cell is placed between the anvils of an ultra high pressure press such as the "cubic" press described in U.S. Pat. No. 3,913,280; or the "belt" type press described in U.S. Pat. No. 3,745,623. Pressure and heat are then applied to efrect the sintering of the crystals. The exact pressures, temperatures, and times will vary depending on factors such as the cell design, etc. It is considered within the skill in the art to determine the correct values for these parameters. Typically, the maximum pressure will range between 50 and 67 Kbar, the maximum temperature will range between 1300 and 1700 deg. C., and the press time can be between 30 seconds to 120 minutes. In the preferred embodiment, the maximum pressure is between about 58 to 60 Kbar, the maximum temperature is about 1600 deg. C., and the pressing time is about 120 seconds at temperature.

After the press cycle, the pressing cell is broken away from the reaction chamber 10. The cup 11 and lids 15 and 16 may be removed either mechanically or chemically. Likewise the the pressure transmitting medium 14 and the separating layer 13, both of which are likely to have fused into a solid mass, can be removed mechanically or chemically.

In addition, depending on the use to which the polycrystalline bodies are to be put, it may be desirable to also chemically leach most of the catalyst/binder binder from the pores of the polycrystalline bodies. Generally, it has been found that when the catalyst/binder binder such as cobalt is leached from the PCD pieces, the pieces are more thermally stable. In the preferred embodiment, the reaction chamber is placed in a hot bath of 15/85 HF/HNO3 for about 240 hours. As a result, the cup 11, the medium 14, the separating layer 13, and most of the cobalt catalyst/binder from the pores of the bodies are removed. The time required varies depending on the size of the PCD or PCBN pieces, the temperature and composition of the bath, and the particle sizes of diamond or CBN used to make the pieces.

The result of the above described process is a quantity of cubic polycrystalline bodies such as the one shown in FIG. 2a which are of approximately the same shape and size as the temporarily held bodies 12. The inventors were somewhat surprised at the degree to which the polycrystalline bodies had retained the shape from the temporarily held bodies. Naturally, the quantity of PCD or PCBN bodies produced in each run depends on several factors such as the size of the temporarily held bodies. As an example, the preferred embodiment has been observed to produce between 4 and 7 carats of PCD which equates to at least 600 cubic which are 0.7 mm on a side.

Alternatively, it may be desirable to not remove the fused pressure transmitting medium from around the polycrystalline bodies. That is, it may be desirable to use the fused medium as a matrix for the polycrystalline bodies formed within it. It may further be desirable to cut the fused medium into the desired shapes and sizes for use.

EXAMPLES
EXAMPLE 1

A quantity of diamond crystals of 0 to 5 microns was ball milled with 13% by weight cobalt powder for about two hours. This mixture was reduced as described above following which paraffin was added to about 10 percent by weight. Acetone was added and the ingredients were mixed in a warm mortar with a pestle. The waxy mixture was then molded with the rubber molds as described above.

The resultant temporarily held bodies were then coated with a separating layer consisting of 85% cobalt and 15% graphite in the manner described above. Next, the coated bodies along with a pressure transmitting medium of cemented tungsten carbide with 10% copper were then alternately poured into a reaction chamber as described above. The cemented tungsten carbide was was a mixture of 200 to 325 mesh, and had a cobalt content of 13 weight percent. The reaction chamber was then heated in a vacuum for about two hours to remove the paraffin. The reaction chamber was then placed in a pressing cell which was in turn placed within an ultra high pressure press and pressed to about 58 Kbars at about 1600 deg. C. for about 120 seconds.

The pressure cell was was then broken away from the reaction chamber. The reaction chamber and its contents were then put into a hot both of HF and HNO3 acid for 40 hours to remove the fused pressure transmitting medium, the separating layers, and any accessible metal in the PCD bodies.

The resultant PCD bodies were found to be well sintered cubes about 0.71 mm on each side which is 25 U.S. mesh when measured by screens. The run produced about 5 carats, or about 800 cubes.

A quantity of these pieces were tested for friability which is an indicator of the toughness, i.e. the fracture resistance, of the bodies. The test consists of placing about 0.2 grams of the pieces in the ½×1½" steel jar of a "Wig-L-Bug" dental amalgam mixer with a ¼" steel ball. The jar was vigorously vibrated for 20 seconds. The results were measured in terms of the percent which were retained by a 35 U.S. mesh screen, i.e. what percentage remained bigger than 35 mesh after the above treatment.

The pieces of this example had a retention of 44%. This can be contrasted with the retention of a commercially available lot of high grade 25-30 mesh single crystal diamond which had 34% retention after the same test.

EXAMPLE 2

The same procedure was followed as in example 1 except that no separating layer was used around the molded cubes. With approximately the same mass of molded shapes loaded into the high pressure cell, this run produced only about 3.5 carats of like cubes. Also, the retention was slightly lower at 38%. Thus, the importance of the separating layer is demonstrated.

EXAMPLE 3

The same procedure as example 1 was followed except that no copper was used in the pressure transmitting medium. The retention was down to 33%. This shows the importance of the added copper to the pressure transmitting medium. That is, it is deduced that the reduced flowability of the medium resulted in inferior PCD formation.

EXAMPLE 4

The same procedure as example 1 was followed except that 15% graphite in cobalt was used in the separating layer. About 6 carats were produced which had a 41% retention.

EXAMPLE 5

The same procedure as example 2 was followed except that 0.56 mm cubes were temporarily molded and the reaction chamber was subjected to a reducing atmosphere at 600 deg. C. after the dewaxing step. About 4½ carats of 40 mesh PCD cubes were produced which had about 56% retention on a 50 mesh screen.

EXAMPLE 6

The same procedure as example 1 was followed except that the reaction chamber was reduced as in example 5. This example is representative of the preferred embodiment. About 6.5 carats were obtained with about 48.5% retention.

The cubes were also found to be thermally stable to about 1100 degrees centigrade in an inert atmosphere. Also, the impact strength, i.e. friability, of the cubes did not change (48.5% retention) after being taken to that temperature whereas the impact strength of the same single crystal diamond dropped by about 26% to 25% retention after the same temperature treatment. This is significant because most of the applications for this type of diamond, involve the setting of the diamond into a partially molten matrix. Typically, the matrix is heated to about 800 to 1200 deg. C.

EXAMPLE 7

The same procedure as example 4 was followed except that copper was added to the pressure transmitting medium in about 20 weight percent and with the reduction step after the dewax cycle as in example 5. The PCD obtained had a retention of about 52%.

EXAMPLE 8

The same procedure as example 4 was followed except that 20% graphite was added to the cobalt in the separating layer and with the reduction step as in example 5. The retention was about 57%. The resultant PCD cubes were more rounded and larger. i.e. about 20 mesh, than example 3. It may be that the some of the graphite in the separating layer has been converted to extra PCD.

EXAMPLE 9

The same procedure as example 1 was followed except that the volume of the temporarily held bodies put into the reaction chamber was doubled and the volume of pressure transmitting medium was accordingly reduced. The resultant cubes were poorly sintered and had a retention of only 21%.

EXAMPLE 10

The same procedure as Example 1 was followed except that a catalyst/binder of silicon powder, present at 16 weight percent with the diamond, was used. Also the pressure transmitting medium consisted of minus 400 mesh silicon powder. A quantity of 25 mesh PCD cubes was obtained which had a retention of 44%.

It should be noted that, although much of the description and all of the examples have involved the production of polycrystalline diamond, the production of polycrystalline cubic boron nitride is also considered within the scope of the present invention. In particular, when producing PCBN bodies according to the present invention, the materials constituting the pressure transmitting medium and the separating layer should be selected so as to be compatible with the catalyst/binder system.

Also, it should be noted that shapes other than cubes can be produced according to the present invention. FIGS. 2b and 2c show just two of the additional possibilities. Likewise, although much of the discussion has centered on relatively small sizes, other sizes can also be produced. For example, this method can be used to produce pieces of about 10 U.S. mesh which could be used as single tool elements. Also, the process may be used to produce pieces of other sizes and shapes such as discs and tiles.

In short, it should be born in mind that the above description is to be interpreted as exemplary and explanatory rather than limiting. Certainly, it is the following claims which define the scope of this invention.

We claim:

1. A method for producing multiple polycrystalline bodies which method comprises the steps of:
   shaping quantities of crystals selected from the group consisting of diamond, graphite, cubic boron nitride, hexagonal boron nitride, and combinations thereof into temporarily held bodies of predetermined shapes and sizes in the presence of a temporary binding means;
   placing a quantity of said temporarily held bodies into a reaction chamber;
   surrounding each of said temporarily held bodies with a powdered pressure transmitting medium after the temporarily held bodies are placed in the reaction chamber; and
   pressing and heating said reaction chamber to a pressure and temperature sufficient to form discrete polycrystalline bodies of approximately the same shapes as said temporarily held bodies of crystals.

2. The method of claim 1 further comprising the step of removing the pressure transmitting medium thereby freeing the discrete polycrystalline bodies.

3. A method for producing multiple polycrystalline bodies, which method comlprises the steps of:
   combining quantities of crystals selected from the group consisting of diamond, cubic boron nitride and combinations thereof with a temporary binding means;
   forming the combination of said crystals and temporary binding agent into temporarily held bodies of predetermined size and shape;
   placing said temporarily held bodies of crystals into a reaction chamber;
   surrounding each of said temporarily held bodies with a powdered pressure transmitting medium after the temporarily he ld bodies are places in the reaction chamber;
   pressing and heating said reaction chamber to a pressure and temperature sufficient to form discrete polycrystalline bodies of approximately the same shapes as said temporarily held bodies of crystals; and
   removing the pressure transmitting medium thereby freeing the discrete polycrystalline bodies.

4. The method of claim 3 wherein the temporary binding means is removed after the temporarily held bodies are surrounded by the pressure transmitting medium and before the reaction chamber is pressed and heated.

5. The method of claim 3 wherein the temporary binding means comprises a wax.

6. The method of claim 3 wherein the temporary binding means is selected from the group consisting of paraffin, napthalene, zinc stearate, and combinations thereof.

7. The method of claim 3 wherein the pressure transmitting medium comprises a powder, which powder comprises grains of a material selected so as to remain substantially solid at the pressure and temperature to which the reaction chamber is subjected.

8. The method of claim 7 wherein the powder comprises grains of cemented metal carbide.

9. The method of claim 8 wherein the powder comprises grains of cemented tungsten carbide.

10. The method of claim 7 wherein the pressure transmitting medium further comprises a quantity of powdered metal.

11. The method of claim 10 wherein the powdered metal is selected from the group consisting of copper, cobalt, nickel, iron, as well as combinations thereof.

12. The method of claim 7 wherein the powder comprises grains of a material selected from the group consisting of silicon, copper, cobalt, and combinations thereof.

13. The method of claim 3 wherein, prior to surrounding the temporarily held bodies with the pressure transmitting medium, the temporarily held bodies are coated with a separating layer.

14. The method of claim 13 wherein the separating layer comprises a sintering aid.

15. The method of claim 14 wherein the sintering aid is selected from the group consisting of the Group VIII metals and combinations thereof.

16. The method of claim 14 wherein the separating layer further comprises a material selected from the group consisting of diamond and graphite.

17. The method of claim 3 wherein the forming step comprises a molding step which comprises:
   providing a mold having at least one cavity;
   pressing the combination of crystals and temporary binding means into said at least one cavity, thereby producing at least one temporarily held body of predetermined shape and size; and
   releasing the at least one temporarily held body from said mold.

18. The method of claim 17 wherein the molding step is followed by a cutting step wherein the temporarily held body is further shaped and sized by cutting.

19. The method of claim 17 further comprising a step of removing at least a portion of said temporary binding means after the temporarily held bodies have been surrounded by the pressure transmitting medium and prior to the step of pressing and heating to form the polycrystalline bodies.

20. The method of claim 3 wherein the forming step comprises an extrusion step which comprises:
   providing a mass of said combination of crystals and temporary binding means, and pushing said mass through a die, thereby producing at least one temporarily held body of predetermined shape and size.

21. The method of claim 20 wherein the extrusion step is followed by a cutting step wherein the temporarily held body is further shaped and sized by cutting.

22. A method for producing multiple polycrystalline diamond bodies which method comprises the steps of:
   combining quantities of diamond crystals and a catalyst/binder material with a wax;
   molding the combination of diamond crystals and wax into temporarily held bodies of predetermined size and shape;
   coating said temporarily held bodies with a separating layer comprising cobalt and graphite powder;
   placing said coated temporarily held bodies in a reaction chamber;
   surrounding said temporarily held bodies with a pressure transmitting medium comprising grains of cemented tungsten carbide and copper powder;
   removing substantially all of said wax from the reaction chamber;
   pressing and heating said reaction chamber to a pressure and temperature sufficient to form discrete polycrystalline diamond bodies of approximately the same shape as said temporarily held bodies; and
   removing the pressure transmitting medium thereby freeing the discrete polycrystalline diamond bodies.

23. The method of claim 22 wherein the polycrystalline bodies produced are between 170 and 7 U.S. mesh.

24. The method of claim 22 wherein the polycrystalline bodies produced are between 40 and 25 U.S. mesh.

25. A method for producing bodies of polycrystalline diamond with a selected shape and size comprising the steps of:
   forming bodies of aggregated crystals of diamond and a temporary binder, having the desired shape and a size sufficiently large to shrink to the desired size upon sintering;
   providing a powdered pressure transmitting medium between adjacent bodies;
   isostatically pressing a plurality of such bodies at a sufficient temperature and pressure to form polycrystalline diamond; and
   removing the separating material for separating the bodies.

26. The method of claim 25 wherein the pressure transmitting medium is coated on the bodies before pressing.

27. The method of claim 26 wherein the pressure transmitting medium comprises cobalt and a material selected from the group consisting of graphite and diamond.

* * * * *